Jan. 22, 1963  H. A. R. DE MIRANDA ET AL  3,075,084
MAGNETIC CORE COUNTING CIRCUIT
Filed Dec. 5, 1958  2 Sheets-Sheet 1
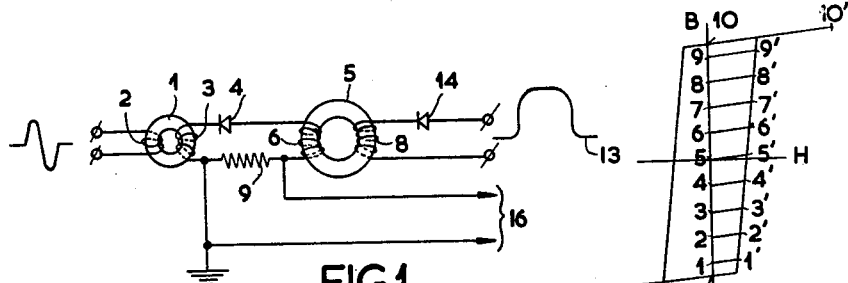
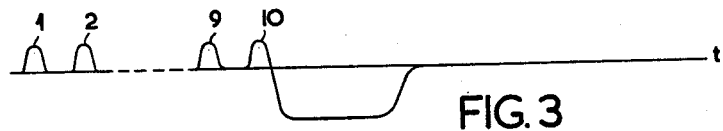
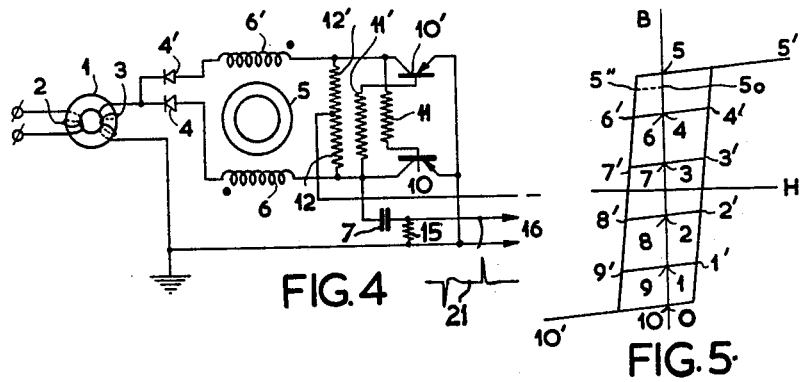
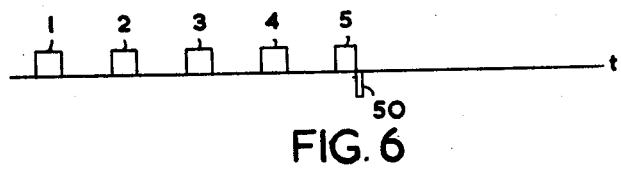
INVENTOR
HEINE ANDRIES RODRIGUES DE MIRANDA
THEODORUS JOANNES TULP
BY
AGENT Jan. 22, 1963  H. A. R. DE MIRANDA ET AL  3,075,084
MAGNETIC CORE COUNTING CIRCUIT
Filed Dec. 5, 1958  2 Sheets-Sheet 2

INVENTOR
HEINE ANDRIES RODRIGUES DE MIRANDA
THEODORUS JOANNES TULP
BY
Frank R. Trifari
AGENT United States Patent Office 3,075,084
Patented Jan. 22, 1963

3,075,084
MAGNETIC CORE COUNTING CIRCUIT
Heine Andries Rodrigues de Miranda and Theodorus Joannes Tulp, Eindhoven, Netherlands, assignors to North American Philips Company, Inc., New York, N.Y., a corporation of Delaware
Filed Dec. 5, 1958, Ser. No. 778,498
Claims priority, application Netherlands Dec. 21, 1957
15 Claims. (Cl. 307—88)

The invention relates to a counting arrangement comprising a closed core of a ferro-magnetic material, having a rectangular hystersis loop, which core is changed over by a given number of input pulses from one saturation condition into an opposite saturation condition i.e., a condition with opposite flux direction.

The invention has for its object to provide an improved and simplified arrangement, which is particularly suitable for continuous counting of pulses. The counting arrangement according to the invention comprises a bistable trigger having two alternately conductive amplifying elements, the respective current circuits of which include two windings arranged in opposite directions on the said counting core the arrangement being such that, if the counting core attains a first saturation state after a sequence of input pulses, the trigger is changed over from one stable state into the other by the voltage fed to it via a counting-core winding exhibiting a reduced impedance, so that the other counting-core winding becomes operative and the subsequent input pulses change the magnetic condition of the counting core in the opposite direction.

Use is preferably made of normalized or quantized input pulses each of which consists of a first part of given polarity and a subsequent second part of opposite polarity; these pulses may be produced, for example, by the change-over of a closed control-core. In a particularly advantageous embodiment of the arrangement according to the invention these pulses are fed, in opposite directions, to the current circuits of the bistable trigger, so that the first part of each input pulse is operative only when the trigger is in a first state, whereas the second part is operative only when the trigger is in the other state. This measure eliminates, in particular, the possibility of an additive error and of a final transfer of an erroneous pulse.

The invention will be described more fully with reference to the drawing, in which:

FIG. 1 shows the circuit diagram of a known counting arrangement comprising a core which is changed over by a given number of pulses from a first into the opposite saturation condition.

FIGS. 2 and 3 show a magnetization diagram and a pulse-time diagram respectively, for explaining the operation of this arrangement.

FIG. 4 shows the circuit diagram of a first embodiment of the arrangement according to the invention.

FIGS. 5 and 6 show the magnetization and pulse-time diagrams concerned.

Figure 7:
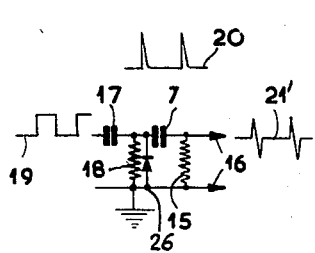
FIG. 7 shows the circuit diagram of a variant of the output circuit of the arrangement shown in FIG. 4.

The known counting arrangement shown in FIG. 1 comprises a pulse generator consisting of a closed core 1 of a ferro-magnetic material having a rectangular hysteresis loop, this core having a primary winding 2 and a secondary winding 3. Input pulses having a first part of given polarity and a second part of opposite polarity are fed to the winding 2 and change over the core 1 from a first saturation state into the other and then back into the first saturation state. Owing to this change-over of the saturation states of the core 1, normalized or quantized voltage pulses having an accurately constant voltage-time integral are produced across the secondary winding 3. The circuit of the winding 3 includes a rectifier 4, a primary winding 6 of the counting core 5 proper and a resistor 9. The first part of each input pulse thus produces a current through this circuit, whereas the second part is suppressed by the rectifier 4. The counting core 5 also has coupled thereto a reset winding 8.

The ratio between the respective numbers of turns of the windings 3 and 6 is chosen to be such that the pulse applied to the winding 6 produces, via the rectifier 4 and the resistor 9, a given variation in the magnetization state of the core 5. This core is also made of a ferro-magnetic material having a rectangular hysteresis loop, for example, of the shape shown diagrammatically in FIG. 2. At the beginning of a counting cycle the core is in a first saturation state, for example in the state designated in FIG. 2 by point 0. The first part of the input pulse is fed via the rectifier 4, subsequent to quantization by the core 1, to the winding 6 and changes over the core 5 into the state of magnetization designated by point 1' in FIG. 2, after which this core remains in the state designated by point 1 owing to its remanence properties. From this point the state of magnetization is changed over by a second pulse into a state of magnetization corresponding to point 2 of FIG. 2, and so forth, until, after nine input pulses, the core 5 is in a state of magnetization corresponding to point 9 of FIG. 2. The tenth pulse saturates the core 5, so that the impedance of the winding 6 is strongly reduced and a considerable voltage is produced across the resistor 9. This voltage is transferred, as an output pulse, to the output terminals 16.

After each tenth pulse or after each pulse transferred to the output terminals 16 a source of reset pulses 13, controlled by the output pulses, feeds, via a rectifier 14, a reset pulse to the winding 8 of the core 5. This reset pulse saturates the core 5 in opposite direction, so that its state of magnetization changes over from point 10 of FIG. 2 to point 0' and then back to point 0. In order to obtain this change-over, the time integral of the voltage of the reset pulse applied to the winding 8 must be at least ten times the time integral of the voltage of each pulse applied to the winding 6 via the rectifier 4. This requires a separate source of reset pulses of longer duration and/or larger amplitude. In the case of a longer duration of the reset pulses, it is not readily possible to obtain them from a central source of pulses, for example, from a source of clock pulses of a computer. If the duration of the reset pulses is, at the most, equal to that of the input pulses, their amplitude must be at least ten times that of the said input pulses and these pulses of large amplitude require an amplifier and/or a source of comparatively high direct voltage; these are not always available. Moreover, under particular conditions, they are likely to induce interference pulses into other parts of a system, for example a computer.

FIG. 3 shows the voltage pulses produced across the winding 6 by an (interrupted) sequence of input pulses and a reset pulse following the tenth input pulse, this reset pulse having double the amplitude and about five times the duration of the input pulse.

The embodiment of the present invention shown in FIG. 4 comprises again a pulse generator, controlled by the input pulses, which consists of a core 1, a primary winding 2 and a secondary winding 3. This generator produces quantized pulses. These pulses are applied via rectifiers 4 and 4' respectively and corresponding collector-emittor circuits of transistors 10 and 10' respectively, alternately to a winding 6 and to a further winding 6' of a counting core 5. The emitter electrodes of the transistors 10 and 10' and one end of the winding 3 are connected to ground. The collector electrodes of the transistors are connected to the windings 6 and 6' respectively and via load resistors 12 and 12' respectively, to a source of negative voltage, whereas the base electrode of each transistor is connected via a resistor 11 and 11' respectively to the collector electrode of the other transistor. Output terminals 16 are connected to ground and to the collector electrode of the transistor 10 respectively via a differentiating network 7, 15.

The transistors 10 and 10' constitute a trigger circuit, which is controlled by the counting core 5 itself and by which the counting-core windings 6 and 6' are connected alternately via the corresponding rectifiers 4 and 4' respectively to the secondary winding 3 of the core 1. At the beginning of a counting cycle the transistor 10, for example, is conductive, whereas the transistor 10' is blocked owing to the voltage drop across the resistor 12 in the collector circuit of the transistor 10. The negative part of a quantized input pulse can thus flow through the winding 6 via the rectifier 4 and the collector-emitter circuit of the transistor 10 and changes over the core 5 from an initial saturation state, designated by point 0 in FIG. 5, via a point 1' into a magnetization state indicated by a point 1. The next-following input pulse changes over the core 5 into a magnetization state corresponding to point 2 of FIG. 5 and so on until this core is driven into its opposite saturation state by the fifth pulse (point 5' of FIG. 5). This saturation state being reached, the impedance of the counting-core winding 6 is strongly reduced, so that a comparatively strong, negative pulse reaches the collector of the transistor 10. Via the resistor 11' this pulse reaches also the base electrode of the transistor 10', whereas the transistor 10 is driven to saturation, so that the trigger including the transistors 10 and 10' changes over. Thus the winding 6 is put out of circuit and the winding 6' is switched in. In the meantime the core 5 has attained a remanence condition, so that its state of magnetization can be represented by point 5 of FIG. 5. The subsequent pulse thus produces a current through the winding 6' with opposite winding-direction and changes over the core 5 into a state of magnetization corresponding to point 6 of FIG. 5 and so on, until the tenth input pulse saturates the core 5 in the opposite direction. This tenth pulse thus drives the core 5 first into a state corresponding to point 10' of FIG. 5, after which it reaches again its initial remanence condition corresponding to point 10 or 0. Owing to the saturation of the core 5, the impedance of the winding 6' is strongly reduced, so that a negative pulse is applied to the collector of the transistor 10' and the base of the transistor 10 and changes over the trigger comprising the transistors 10 and 10'.

Each input pulse driving the counting core 5 into its saturation condition 5', 5, produces also a negative pulse across the resistor 15 each pulse resetting the counting core into its first saturation state 10', 10 produces a positive pulse across the same resistor, as is indicated at 21 in FIG. 4. By means of these pulses a control-core of a subsequent stage can be caused to change over forward and backward, so that a complete magnetization cycle of this control-core is obtained with ten complete magnetization cycles of the control-core 1. Output pulses 21 may be obtained from the collector of transistor 10 by means of an output circuit comprising capacitor 7 and resistor 15, which act as a differentiating network.

In accordance with a variant of the output circuit, shown in FIG. 7, the square-wave voltage 19 at the collector of the transistor 10 is transferred via a first capacitor 17 to the differentiating network 7, 15, whilst a reversely connected rectifier 26, shunted by a resistor 18, suppresses the negative pulses. The rectified pulses 20, produced via the rectifier 18, are differentiated by the network 7, 15, so that when the counting core 5 returns into its first saturation state 10', 10, a positive and a negative pulse are produced at the output terminals 16.

Figure 8:
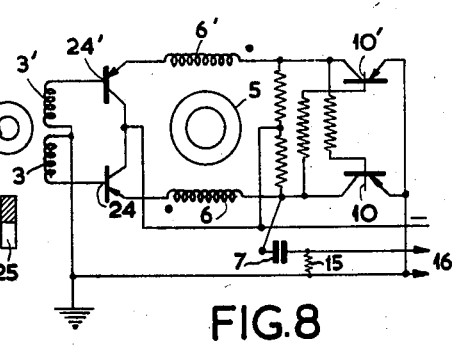
FIG. 8 shows the circuit diagram of a second embodiment.
Figure 9:
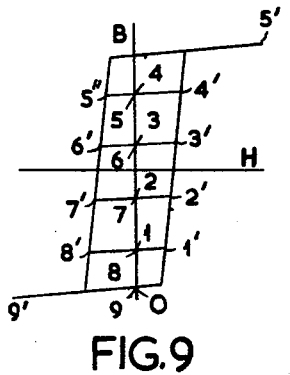
FIGS. 9 and 10 show the corresponding magnetization and pulse-time diagrams.
Figure 10:
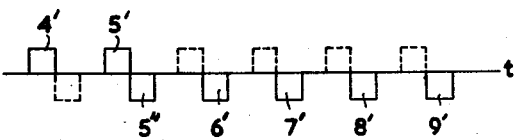

Under certain circumstances, for example, if the operational rate of the trigger comprising transistors 10' and 10 is not chosen correctly with respect to the duration of the input pulses and/or if the time integral of the voltage of the input pulses alternately applied to the counting-core windings 6 and 6' is not adjusted with sufficient accuracy to the desired integral division ratio between the number of input pulses and the number of output pulses, it may occur that for example, the end of the fifth pulse passes via the winding 6' and the magnetization of the core 5 varies by a small amount in opposite direction, as is designated by the points 5'' and $5_0$ in FIG. 5. FIG. 6 also shows a sequence of five voltage pulses applied to the windings 6 or 6' the last part of the fifth pulse being indicated at $5_0$ with reverse polarity, to show that this part of the fifth pulse passes through the wrong winding 6'. The error in the state of magnetization of the core 5, caused by a last part of an input pulse such that the core is saturated, is additive. After a certain number of counting or magnetization cycles, the core may therefore change over too early by one input pulse. This fundamental disadvantage is avoided in the embodiment shown in FIG. 8. This embodiment comprises a control-core 1 with a primary winding 2 and a secondary winding consisting of two sections 3 and 3'. The counting core 5 has two windings 6 and 6' with opposite winding directions. One end of each of these windings is connected to ground via the collector-emitter circuit of a transistor 10 and 10' respectively, which transistors constitute a trigger circuit similar to that of the embodiment shown in FIG. 4. The rectifiers 4 and 4' of the embodiment of FIG. 4 are replaced by two amplifying transistors 24 and 24' respectively in grounded collector arrangement, which step down the natural impedance of the pulse generator 1, 2, 3, 3'. The collector electrodes of these transistors are directly connected to the negative-voltage source, which also feeds the collector circuits of the transistors 10 and 10'. The base electrodes of the transistors 24 and 24' are controlled in opposite directions, by the corresponding sections 3 and 3' respectively of the control-winding so that, for example, only the first negative part of an input pulse produced across the section 3 of the control-winding can be applied to the winding 6 via the transistor 24 and only the second part of an input pulse produced across the section 3' of the control-winding can be applied via the transistor 24' to the winding 6' as a negative pulse. In view of the dual control-winding by which the transistors 24 and 24' are driven in opposite directions, these transistors consequently serve to suppress a part of the input pulse which tends to flow through the wrong winding 6 or 6', for example, the part $5_0$ of the pulse 5 of FIG. 6. This part $5_0$ of the pulse 5 of FIG. 6 would, indeed, drive the transistor 24' in the wrong direction, so that it would only be blocked and would not pass this part of the pulse 5 to the winding 6'. On the other hand, any part of an input pulse can be operative only when the corresponding transistor 10 or 10' of the trigger is conductive. As is indicated in FIGS. 9 and 10, only the first (positive) part of the first four input pulses of a counting cycle will be operative. The first part of the fifth input pulse drives the core 5 into its saturation state, as is indicated by point 5' in FIG. 9, whereas the negative part drives the core 5 by a full step into the opposite saturation state, as is indicated by points 5" and 5 of FIG. 9. Only the negative part of each of the further pulses is operative until the core 5 is returned to its initial saturation state by the ninth pulse, as is indicated by points 9' and 9 of FIG. 9.

Figure 11:
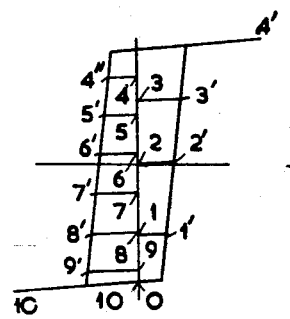
FIGS. 11 and 12 show magnetization and pulse-time diagrams for explaining the operation of a variant of the arrangement shown in FIG. 8.
Figure 12:
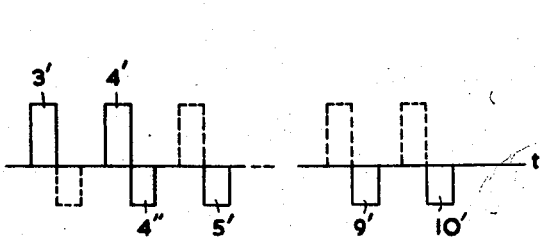

Consequently, this arrangement is capable of counting according to an odd-number system without risk of an additive error. However, it may also be used to count according to an even number system. In accordance with a variant of the arrangement shown in FIG. 8 the respective numbers of turns of the two counting-core windings 6 and 6' are unequal. As illustrated in FIGS. 10 and 11, if then the values of the respective time integrals of the voltage of the input pulses applied to these windings are equal to each other, it may be ensured that the counting core is driven from a first saturation state (point 0 in FIG. 11) into a second saturation state (point 4' in FIG. 11) and back by a smaller step (point 4 in FIG. 11) by a first number of input pulses (for example by four pulses as shown in FIG. 11) and that it is driven back from this point 4 into the first saturation state (10=0) by a second number of input pulses (six in FIG. 11). It must be thus ensured that the sum of the numbers of input pulses is even. The same result may, of course, also be obtained by rendering unequal the two sections 3 and 3' of the control-winding, since the division ratio between the number of input pulses and the resulting number of output pulses is related to the ratio $$\frac{n_6 \cdot \Phi_5}{n_3 \cdot \Phi_1}$$

wherein $\Phi$ designates the total flux variation of the corresponding core between its two opposite saturation states and $n$ designates the number of turns of the corresponding winding or winding section of the cores 1 and 5 respectively.

In accordance with a further variant the arrangement is provided with means for producing a transverse magnetic field in the counting core 5 and/or in the control-core 1. These means consist preferably of a small permanent magnet 25, which is arranged at an adjustable distance and/or with an adjustable orientation with respect to the core concerned. By producing a transverse field in the counting core 5, the number of input pulses required for one complete operational cycle is reduced, since the magnetic excursion $\Phi_5$ of this core is thus reduced. By controlling the intensity of the transverse field in the counting-core, the number of input pulses required for one complete operational cycle can thus be adjusted to a desired value. By producing a transverse magnetic field in the control-core 1, however, the magnetic excusion of this core is reduced, so that the number of input pulses required for one complete operational cycle is raised. By reducing the magnetic excursion $\Phi_1$ of the control-core, the amplitude of the pulses produced at each change-over of the core is also reduced. Thus the time integral of the voltage of the quantized input pulses is reduced. With the aid of a transverse magnetic field in the control-core the number of input pulses required for one complete operational cycle can thus also be adjusted to a desired value.

The variation in the number of input pulses required for one complete operational cycle with the aid of a transverse magnetic field in the counting core and/or in the control-core is considerable. By means of a transverse magnetic field in the control-core 1 of the counting circuit shown in FIG. 8 the division ratio of the pulses was brought from nine input pulses per output pulse to thirty-one to thirty-three input pulses per output pulse. An output circuit comprising capacitor 7 and resistor 15 is shown in FIG. 8. Alternatively, an output circuit such as shown in FIG. 7 may also be used.

Counting circuits according to the invention may, for example, be used in computers, in combination with a read-out circuit if desired. Together with a read-out circuit, they may constitute totalisators for a memory storage. These counting circuits may furthermore be combined with a magnetic drum, the latter operating as a permanent memory, whilst the counting circuit according to the invention can operate as a position indicator for the drum. Further potential uses are in the domain of telephone multiplex systems and of television, where counting circuits according to the invention may be used as pulse division circuits. As a matter of course, they may be used as accurate, adjustable time-delay circuits and, moreover, in general for counting irregularly arriving pulses; in this case the counting can start again automatically after a given number of incoming pulses.

The counting circuits described are substantially insensitive to variations of the supply voltage. Moreover, the amplitude of the incoming pulses is not critical. Consequently, a very stable analogue divider may be composed on the basis of one or other embodiment of the counting circuit according to the invention.

What is claimed is:

1. A counting circuit comprising: a closed counting core composed of a ferromagnetic material having a rectangular hysteresis loop, first and second windings coupled to said core, said windings being wound on said core in opposite directions with respect to each other, a source of input pulses, a bistable trigger including two alternately conductive amplifying elements, the main current path of each amplifying element being connected in series with a respective one of said windings, means for applying said input pulses to said windings, said core being driven from a first saturation condition into a second saturation condition having opposite flux direction by a given number of input pulses, said trigger being driven from one stable state into its other stable state when said core reaches one saturation condition upon the application of said given number of input pulses.

2. A counting circuit as claimed in claim 1, wherein each input pulse consists of a first portion of given polarity and a second portion of opposite polarity, said first portion being operative only when the trigger is in a first stable state, said second portion being operative only when the trigger is in the other stable state.

3. A counting circuit comprising: an annular counting core composed of a ferromagnetic material having a rectangular hysteresis loop, first and second windings coupled to said core, said windings being wound on said core in opposite directions with respect to each other, a source of input pulses, means for applying said input pulses to said windings, said core being driven from a first saturation condition into a second saturation condition having opposite flux direction by a first given number of input pulses through said first winding and from the second saturation condition to the first saturation condition by a second given number of input pulses through said second winding, and means responsive to said first and second saturation conditions to complete a circuit path for said first and second groups of pulses through said first and second windings respectively.

4. A counting circuit comprising: an annular counting core composed of a ferromagnetic material having a rectangular hysteresis loop, first and second windings coupled to said core, said windings being wound on said core in opposite directions with respect to each other, a source of input pulses coupled to said windings, said core being driven from a first saturation condition into a second saturation condition having opposite flux direction by a first predetermined group of input pulses applied to said first winding and from the second saturation condition to the first saturation condition by a second predetermined group of input pulses applied to said second winding, and a bistable trigger circuit coupled to said windings, said trigger being driven from one stabe state into its other stable state responsive to said first and second saturation conditions to complete a circuit path for said first and second groups of pulses through said first and second windings respectively.

5. A counting circuit as set forth in claim 1, wherein said means comprises coupling amplifier elements arranged between said source and each of said windings.

6. A counting circuit as set forth in claim 2, wherein said means comprises coupling amplifier elements arranged between said source and each of said windings.

7. A counting circuit as claimed in claim 5, wherein said amplifier elements comprise transistors in which the base of each is connected to the source and the emitter of each is connected to a respective winding.

8. A counting circuit as claimed in claim 6, wherein said amplifier elements comprise transistors in which the base of each is connected to the source and the emitter of each is connected to a respective winding.

9. A counting circuit comprising: an annular counting core composed of a ferromagnetic material having a rectangular hysteresis loop, first and second windings coupled to said core, said windings being wound on said core in opposite directions with respect to each other, a source of input pulses, means for applying said input pulses to said windings, said core being driven from a first saturation condition into a second saturation condition having opposite flux direction by a first given number of input pulses through said first winding and from the second saturation condition to the first saturation condition by a second given number of input pulses through said second winding, and means responsive to said first and second saturation conditions to complete a circuit path for said first and second groups of pulses through said first and second windings respectively, the numbers of turns of the first and second windings being unequal and the respective time integrals of the input pulse voltages applied to these windings being equal to each other.

10. A counting circuit as set forth in claim 2, wherein the numbers of turns of the first and second windings are unequal and the respective time integrals of the input pulse voltages applied to these windings are equal to each other.

11. A counting circuit comprising: a closed counting core composed of a ferromagnetic material having a rectangular hysteresis loop, first and second windings coupled to said core, said windings being wound on said core in opposite directions with respect to each other, a source of input pulses, a bistable trigger including two alternately conductive amplifying elements, the main current path of each amplifying element being connected in series with a respective one of said windings, means for applying said input pulses to said windings, said core being driven from a first saturation condition into a second saturation condition having opposite flux direction by a given number of input pulses, said trigger being driven from one stable state into its other stable state when said core reaches one saturation condition upon the application of said given number of input pulses, and means for producing a transverse magnetic field in said counting core, said field acting to reduce the number of input pulses required for a complete saturation cycle.

12. A counting circuit comprising: an annular counting core composed of a ferromagnetic material having a rectangular hysteresis loop, first and second windings coupled to said core, said windings being wound on said core in opposite directions with respect to each other, a source of input pulses, means for applying said input pulses to said windings, said core being driven from a first saturation condition into a second saturation condition having opposite flux direction by a first given number of input pulses through said first winding and from the second saturation condition to the first saturation condition by a second given number of input pulses through said second winding, means responsive to said first and second saturation conditions to complete a circuit path for said first and second groups of pulses through said first and second windings respectively, and means for producing a transverse magnetic field in said counting core, said field acting to reduce the number of input pulses required for a complete saturation cycle.

13. A counting circuit comprising: a closed counting core composed of a ferromagnetic material having a rectangular hysteresis loop, first and second windings coupled to said core, said windings being wound on said core in opposite directions with respect to each other, a source of input pulses, a bistable trigger including two alternately conductive amplifying elements, the main current path of each amplifying element being connected in series with a respective one of said windings, means for applying said input pulses to said windings, said core being driven from a first saturation condition into a second saturation condition having opposite flux direction by a given number of input pulses, said trigger being driven from one stable state into its other stable state when said core reaches one saturation condition upon the application of said given number of input pulses, each input pulse consisting of a first portion of given polarity and a second portion of opposite polarity, said first portion being operative only when the trigger is in a first stable state, said second portion being operative only when the trigger is in the other stable state, and means for producing a transverse magnetic field in the counting core, said transverse field being operative to reduce the number of input pulses required to effect a complete saturation cycle.

14. A counting circuit comprising: a closed counting core composed of a ferromagnetic material having a rectangular hysteresis loop, first and second windings coupled to said core, said windings being wound on said core in opposite directions with respect to each other, a source of input pulses, a bistable trigger including two alternately conductive amplifying elements, the main current path of each amplifying element being connected in series with a respective one of said windings, means for applying said input pulses to said windings, said core being driven from a first saturation condition into a second saturation condition having opposite flux direction by a given number of input pulses, said trigger being driven from one stable state into its other stable state when said core reaches one saturation condition upon the application of said given number of input pulses, said source of input pulses comprising a closed input core composed of a ferromagnetic material having a rectangular hysteresis loop, an input winding and an output winding coupled to the input core, said input core being adapted to be changed from a first saturation to a second saturation condition by a pulse applied to said input winding, said input pulses being produced at said second winding, and means for producing a transverse magnetic field in said input core.

15. A counting circuit comprising: an annular counting core composed of a ferromagnetic material having a rectangular hysteresis loop, first and second windings coupled to said core, said windings being wound on said core in opposite directions with respect to each other, a source of input pulses, means for applying said input pulses to said windings, said core being driven from a first saturation condition into a second saturation condition having opposite flux direction by a first given number of input pulses through said first winding and from the second saturation condition to the first saturation condition by a second given number of input pulses through said second winding, and means responsive to said first and second saturation conditions to complete a circuit path for said first and second groups of pulses through said first and second windings respectively, said source of input pulses comprising a closed input core of ferromagnetic material having a rectangular hysteresis loop, an input winding and an output winding coupled to the input core, said input core being adapted to be changed from a first saturation condition to a second saturation condition by a pulse applied to said input winding, said input pulses being produced at said second winding, and means for producing a transverse magnetic field in said input core.

References Cited in the file of this patent

UNITED STATES PATENTS

| | | |
|---|---|---|
| 2,838,669 | Horsch | June 10, 1958 |
| 2,891,170 | Paull | June 16, 1959 |
| 2,916,729 | Paull | Dec. 8, 1959 |